Aug. 23, 1938.   H. G. JOHNSTONE   2,127,644
COMPUTING APPARATUS
Filed Oct. 5, 1935   3 Sheets-Sheet 1
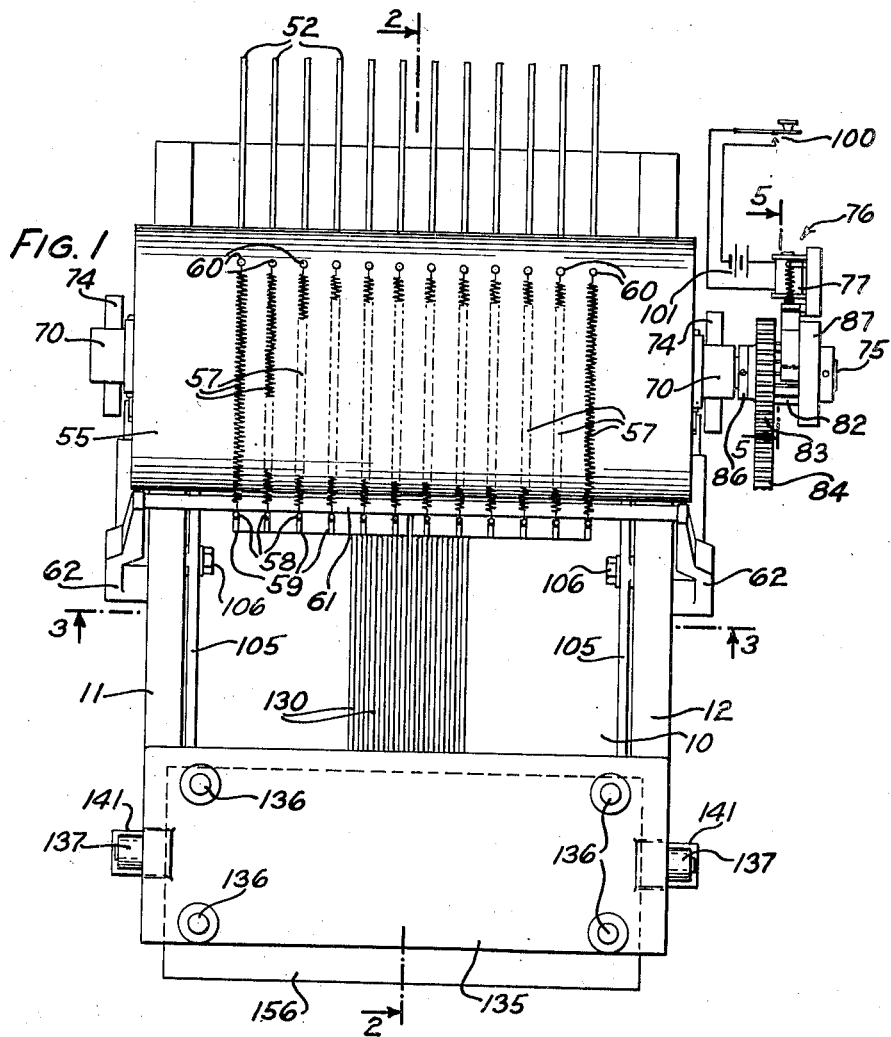
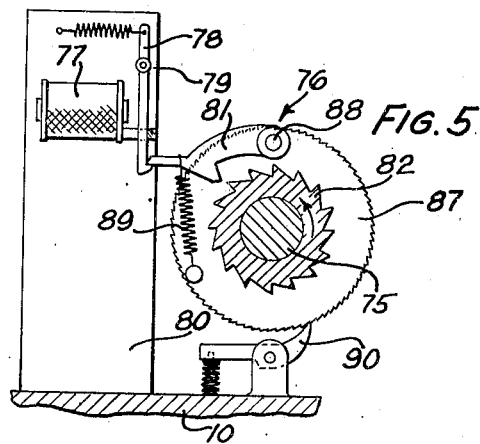
INVENTOR
*H. G. JOHNSTONE*
BY *H. Q. Whitehorn*
ATTORNEY

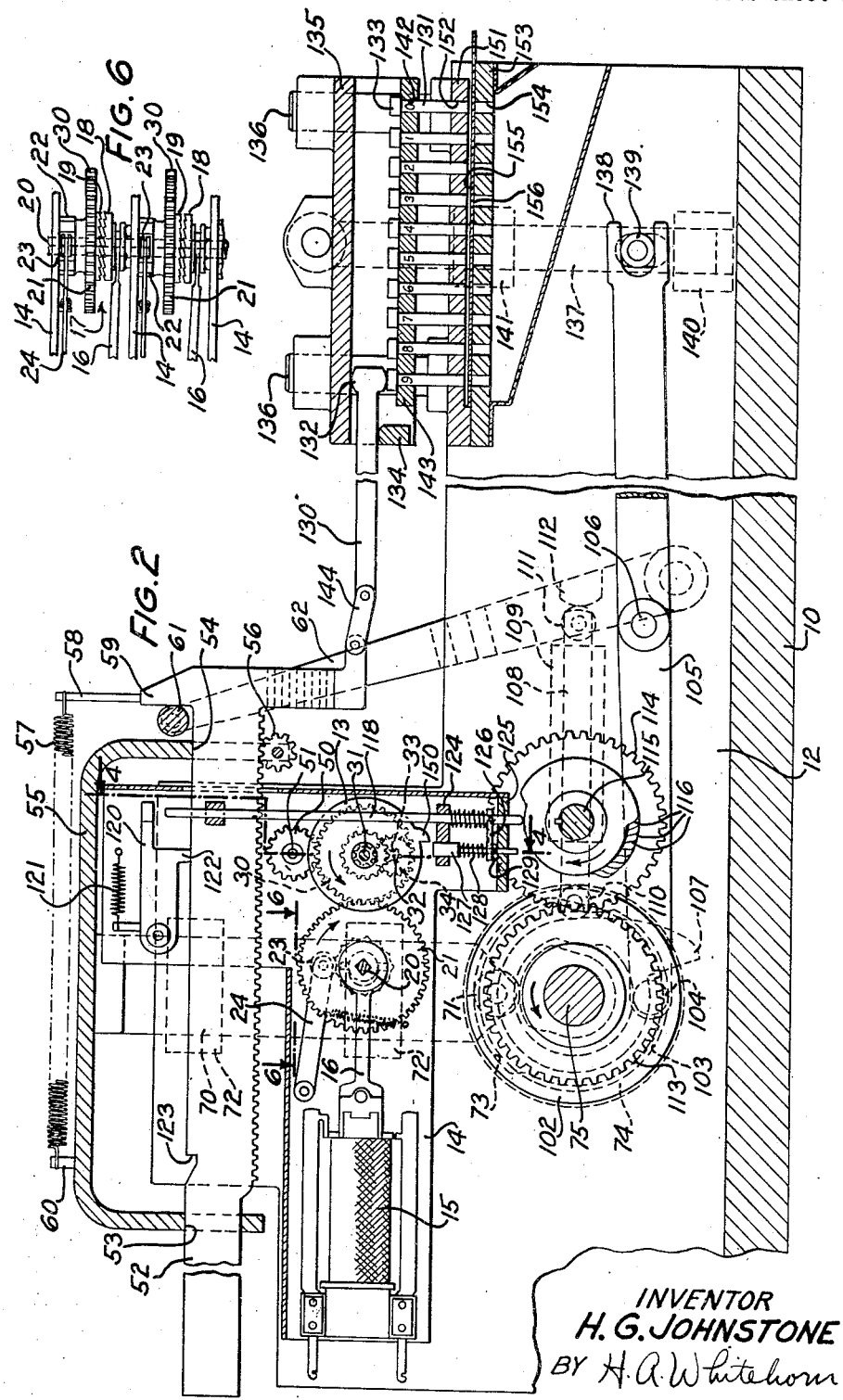

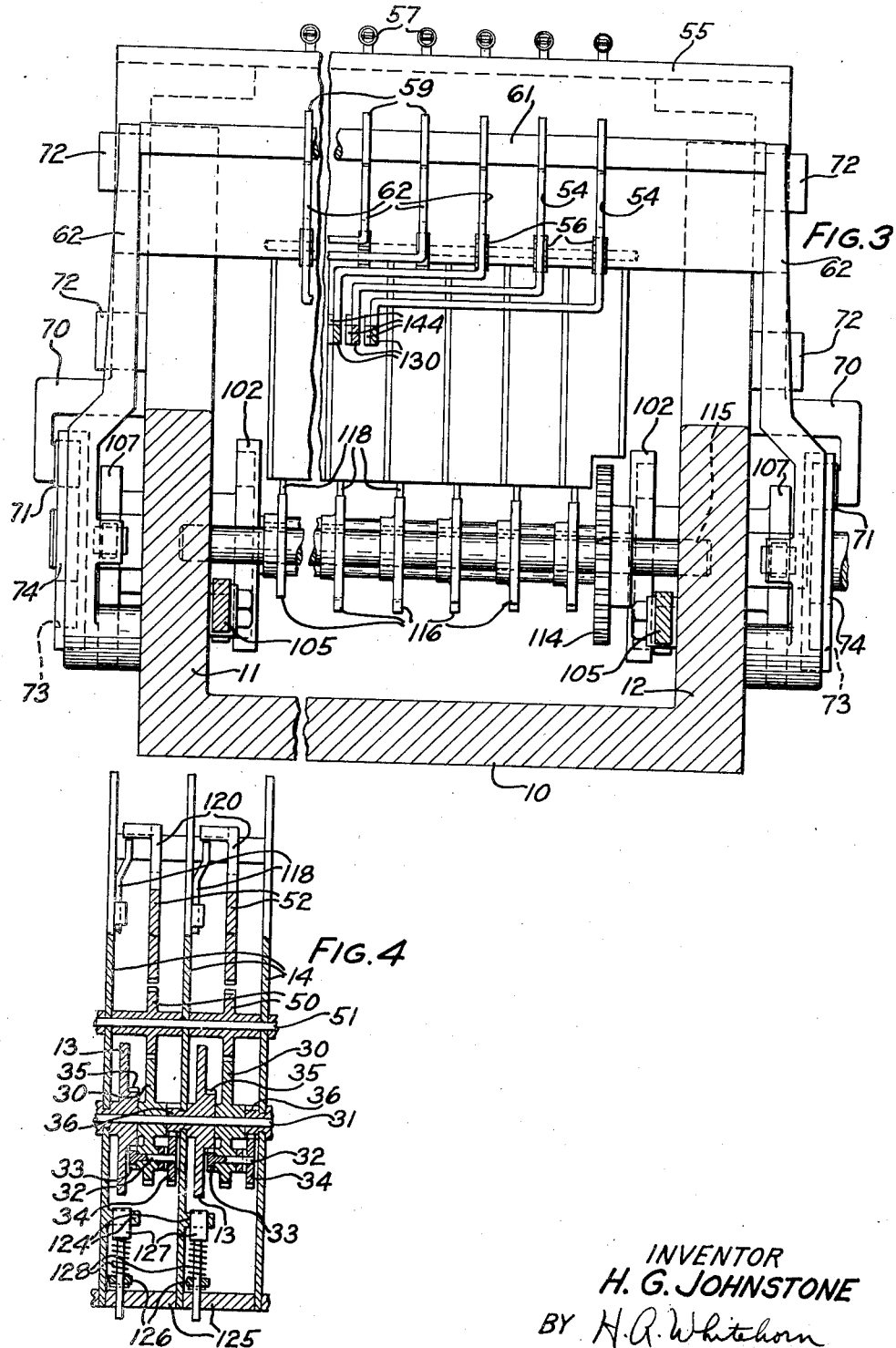

Patented Aug. 23, 1938

2,127,644

UNITED STATES PATENT OFFICE 2,127,644

COMPUTING APPARATUS

Harold G. Johnstone, Berwyn, Ill., assignor to Western Electric Company, Incorporated, New York, N. Y., a corporation of New York Application October 5, 1935, Serial No. 43,657

6 Claims. (Cl. 235—58)

This invention relates to computing apparatus and more particularly to the combination of a reading out device for an accumulator and a recording device.

An object of the invention is to facilitate the reading of the result in an accumulator of the creeping carry type.

In accordance with one embodiment of the invention a creeping carry accumulator is simultaneously returned to zero indicating position and read into a perforating mechanism by dropping a spring actuated rack into engagement with the actuating gear of each order of the accumulator, latching the racks in this position, and then releasing the racks successively beginning with the lowest order rack whereby the racks will rotate the numeral wheels back to their zero positions and the racks will therefore be moved out of their latched position an amount corresponding to the number which was stored in their associated numeral wheels. The racks in this embodiment of the invention are connected to the selector bars of a perforator and by their movement cause the selector bars to select perforators for actuation by a ram whereby the result previously stored in the accumulator may be recorded.

Other features and advantages of the invention will be apparent from the following description when considered in conjunction with the accompanying drawings, wherein Fig. 1 is a plan view of a perforating mechanism and a result reading mechanism for controlling the perforating mechanism;

Fig. 2 is an enlarged sectional view taken along the line 2—2 of Fig. 1 in the direction of the arrows;

Fig. 3 is an enlarged vertical sectional view taken along the line 3—3 of Fig. 1 in the direction of the arrows;

Fig. 4 is a sectional view taken along the line 4—4 of Fig. 2 in the direction of the arrows;

Fig. 5 is an enlarged sectional view taken along the line 5—5 of Fig. 1 in the direction of the arrows, and Fig. 6 is a fragmentary sectional view taken along the line 6—6 of Fig. 2 in the direction of the arrows.

Referring now to the drawings wherein like reference numerals indicate the same parts throughout the several views, particular reference being had to Figs. 2 and 3, a base 10 is provided having irregularly shaped sides 11 and 12 extending upwardly therefrom. Mounted between the sides 11 and 12 adjacent their left ends (Fig. 2) is an electrically controlled accumulator comprising a plurality of denominational orders of accumulator indicating elements 13. This accumulator is of the creeping carry type such as that disclosed in United States Patent 1,881,640 to H. G. Johnstone, issued October 11, 1932. The accumulator may be controlled in its accumulating operations by any calculating device which produces the result of a computation in the form of electrical impulses, the duration of which determines the amount of rotation of an accumulator element or accumulator elements. As is obvious from the type of accumulator disclosed, the accumulator may be located remotely from its associated computing mechanism and have the amounts to be accumulated in its various orders transmitted to it electrically.

For the sage of illustration, an accumulator of twelve denominational orders has been chosen. The mechanism for each order of the accumulator is mounted between cooperating side plates 14 (Figs. 2, 4 and 6) and comprises an electromagnetically controlled register section. The side plates 14 have apertures therein for accommodating a shaft 20 which rotates continuously in synchronism with the other moving parts of the calculating mechanism (not shown), and also a shaft 31 upon which are mounted the accumulator indicating elements 13. All of the accumulating or registering sections are similarly constructed. For this reason like reference numerals have been employed to designate like parts in all sections and it is believed that the following detailed description of one of the registering sections is sufficient to a complete understanding of their construction and mode of operation. Each accumulator section comprises the accumulator indicating element 13 individually actuated by suitable gearing from the shaft 20; its actuation being controlled by a clutch mechanism indicated generally by the numeral 17. The clutch is composed of a driving member 18 and a driven member 19. The driving member is mounted upon the shaft 20 and keyed slidably thereto, whereas the driven member 19 is supported by the shaft 20 but only rotated therewith when the driving clutch member is moved into engagement with the driven member 19. Each section also comprises an electromagnet 15 adapted to receive impulses from a computing mechanism or the like.

When the electromagnet 15 is energized, its armature 16, which has its right end (Fig. 2) bifurcated to form a yoke extending into a cooperating circumferential groove in the clutch driving member 18, will cause the clutch driving member to engage with the driven member 19 thereby to impart rotation to the driven member 19 for a length of time corresponding to the duration of energization of the electromagnet 15. Secured to the driven member 19 is a gear 21 and a center stop drum 22 which has cooperating therewith a spring pressed center stop roller 23 mounted upon the right end (Fig. 2) of a center stop lever 24. The center stop drum 22 and its cooperating roller 23 serve to accurately position the gear 21 in any one of a plurality of positions so that the gear 21 will always stop in a position indicating the input through the operation of the electromagnet 15 of whole numbers.

Associated with each of the indicating elements 13 is a carrying device comprising a train of interconnected planetary gears constructed and arranged so that the actuation or rotation of any of the indicating elements 13 causes a simultaneous rotation of the adjacent indicating element 13 of higher denominational orders in the ratio between adjacent elements of one to ten; for example, while the units indicating element makes one-tenth of a revolution, the tens (T) indicating element makes one one-hundredth of a revolution; the hundreds (H) accumulator indicating element makes one one-thousandth of a revolution, etc. It will be apparent from what follows that the gearing is differential so that the indicators may be individually actuated by the associated gears 21 or by a carry from a lower order.

A gear 30 is provided for each of the indicating elements 13 and is rotatably mounted upon a shaft 31 and meshes with the gear 21. Each gear 30 carries an eccentrically disposed pin or stud shaft 32, and gears 33 and 34 are secured to this stud shaft on opposite sides of the gear 30. The gear 33 meshes with a gear 35 mounted upon the shaft 31 and formed integrally with the associated indicating element 13, and the gear 34 meshes with a gear 36 formed integrally with the adjacent indicating element 13 of the next lower denominational order. The arrangement is such that the indicating elements are actuated simultaneously with the actuation of indicating elements of lower denominations in the ratios of one to ten, one to one-hundred, one to one-thousand, etc.

The mode of operation of an accumulator of this type during the operation of a computing mechanism to cause this type of accumulator to accumulate successive digital values is completely described in the aforementioned patent to H. G. Johnstone, and since the present invention is not concerned with the mode of entering items into an accumulator of this type, no further description of that operation is deemed necessary herein. It will be understood, however, that when a series of digital values have been stored in a register of this type, the indicating element of the lowest denomination will be rotated to a position to indicate whole numbers, whereas the elements of higher orders will successively indicate decimal fractions based on the digital values stored in the lower orders of the accumulator as is common to accumulators of this type; for example, if the number 999 is put into the first three orders of the accumulator, the lowest order or units indicating element 13 will stand exactly in the nine position, whereas the tens order indicating element will be rotated through nine and nine-tenths of a revolution, the hundreds indicating element will be rotated through nine and ninety-nine one-hundredths of a revolution. The thousandths denominational order indicating element will be rotated through nine-hundred and ninety-nine one-thousandths of a position or to approximately the position where it indicates one. The other higher orders will be rotated corresponding amounts.

In accordance with the embodiment of the invention shown, it is proposed to read the numbers stored in the accumulator while the accumulator is being reset to its zero position, and to set perforating mechanism to make a permanent record of the number stored in the accumulator. For this purpose a gear 50 is provided which meshes with each of the gears 30. The gears 50 are freely rotatable about a shaft 51 extending between the irregularly shaped sides 11 and 12, and each of them has a rack 52 positioned in direct vertical alignment, but normally out of mesh with it during the computing operations, when the indicating elements 13 are having numbers stored therein. The racks 52 are slidably mounted in slots 53 and 54 formed in a vertically movable carriage 55, an idler gear 56 being positioned for rotation in each of the slots 54 to support the toothed portion of the rack 52. Each rack has individual thereto a spring 57 connected to a pin 58 mounted on an upwardly extending portion 59 of the rack. The other end of each of the springs 57 is secured to a pin 60 fixed to the flat top of the carriage 55 so that normally the tension of the spring 57 holds the racks 52 in their left hand position (Fig. 2) where the upwardly extending portion 59 of the racks engages a cross arm 61 secured to a pair of rack actuating levers 62.

The carriage 55 is supported by a pair of vertically extending arms 70—70 (Figs. 2 and 3) which carry at their lower extremities cam rollers 71 and which are slidable in brackets 72—72 secured to the sides 11 and 12. The cam rollers 71 ride in cam grooves 73 of cams 74. The cams 74 are fixed upon a shaft 75 and upon the rotation of the shaft 75 through one complete revolution the carriage 55 will be reciprocated carrying with it the racks 52.

Power is supplied to the shaft 75 through a single revolution clutch indicated generally by the numeral 76 (Fig. 1). The clutch 76 is electromagnetically controlled, and includes an electromagnet 77, the armature of which is in the form of a spring pressed latch 78 pivoted at 79 to an upright member 80 mounted on the base 10 and normally urged to rotate about its pivot in a counterclockwise direction. The latch 78 normally holds a pawl 81 out of engagement with ratchet teeth 82. The ratchet teeth 82 are rigidly secured to a gear 83 which meshes with a constantly driven gear 84 driven by a suitable power source (not shown). The gear 83 is freely rotatable about the shaft 75 being positioned between a collar 86 pinned to the shaft and a disk 87 also pinned to the shaft. The pawl 81 is pivoted on the disk 87 at 88 and is normally urged toward the ratchet teeth 82 by a contractile spring 89 secured to the outer end of the pawl and to the disk 87. A spring tensioned pawl 90 is provided for preventing the rotation of the disk 87 in a clockwise direction by the spring 89 when the pawl 81 engages the latch 78.

The electromagnet 77 may be energized at any time that it is desired to return the accumulator to zero indicating position and record the reading of the accumulator by closing the key 100 to connect battery at 101 through the winding of the electromagnet 77 (Fig. 1). It will be understood that if desired the key 100 may be closed automatically. When the electromagnet 77 is energized it will release the pawl 81 which will engage in the ratchet teeth 82 and interconnect the gear 83 with the shaft 75 to drive the shaft 75 through one complete revolution. At the end of one revolution the pawl 81 will engage the latch 78 and disengage from the teeth 82. The shaft 75, in rotating through one complete revolution, will reciprocate the carriage 55 at a predetermined time in the cycle of rotation of the shaft 75.

The shaft 75 has a second pair of cams 102 mounted thereon in each of which there is a cam groove 103. The cam grooves 103 have cooperating therewith cam rollers 104 mounted upon the ends of ram actuating levers 105 pivoted to the plates 11 and 12 at 106.

A third pair of cams 107 are secured to the shaft 75 for driving the rack actuating levers 62 through push rods 108 slidably mounted in brackets 109 and having rollers 110 and 111 at their left and right ends, respectively (Fig. 2). The rollers 110 bear against the surfaces of the cams 107 and the rollers 111 bear against projections 112 on the rack actuating levers 62.

Any one or all of the springs 57 tend to rock the rack actuating levers 62 in a counterclockwise direction about their pivots. Once in each rotation of the shaft 75 the cams 107 will rock the rack actuating levers in a clockwise direction (Fig. 2) against the action of the springs 57 to carry the racks 52 to their extreme right hand position (Fig. 2). When the racks 52 are moved to the right (Fig. 2) they will be temporarily latched in that position by spring pressed latches 120 which have contractile springs 121 for holding them in engagement with the upper surface of the racks and for moving the latching portion 122 thereof into notches 123 in the upper surface of the racks. While the racks 52 are locked in their right hand position, as just described, the carriage 55 will be moved by its cams 74 into its lower position where the racks 52 will mesh with their associated gears 50.

Also carried by the shaft 75 is a gear 113 which meshes with a gear 114 secured to a shaft 115 journaled in the sides 11 and 12. The shaft 115 carries a plurality of cams 116 one of which is associated with each order of the accumulator and is adapted to actuate a latch release pin 118 associated with its respective denominational order of the accumulator.

The series of cams 116 are adapted to actuate their associated latch release pins 118 successively starting with the lowest order of the accumulator, and when they are operated they engage the spring pressed latch 120 in their particular denominational order to move the latch 120 upwardly against the action of the contractile spring 121 to move the latching portion 122 out of the notch 123. When a rack 52 is thus released its associated spring 57 will tend to move it back to normal position as shown in Fig. 2. The construction of the cams 116 is such that the latch release pins 118 are operated successively, held operated for predetermined intervals and all returned simultaneously after the carriage 55 has been moved to its upper position (Fig. 2).

Each of the latch release pins 118 is slidable in plates 124 and 125 fixed to the side plates 14 and has secured thereto a plate 126 which slidably supports a spring pressed abutment 127 normally urged upwardly by a spring 128 and extending through an aperture in the plate 124. The upward movement of the abutment is limited by a pin 129 which extends through it and engages the lower surface of the plate 126. When the pins 118 are cammed upward, the abutment 127 will move into engagement with the surface of the indicating element 13 which has a stop 150 formed thereon and when the indicating elements are rotated in a clockwise direction the abutment will engage the straight edge of the stop 150 to stop the indicating element in its zero indicating position.

Each of the racks 52 has linked thereto, by means of a link 144 a selector bar 130 adapted to select for actuation any one of a series of perforating pins 131 associated with that particular denominational order of the accumulator. Since the racks 52 are spaced relatively far apart to mesh with the gears 52 and since the right hand ends of them (Fig. 2) must be in alignment with the columns of a statistical card the right ends are bent so that they will, when assembled, be nested.

The selector bars are provided with enlarged heads 132 which travel over the heads 133 of the pins 131 to select the pins for actuation as determined by the distance which the selector bar 130 is permitted to travel when the racks are retracted by the spring 57 to rotate the indicator elements 13 to their zero positions. There are twelve selector bars 130 provided which are slidably mounted upon a cross member 134 secured to a reciprocating ram 135. The ram 135 is slidably mounted on pins 136 and is connected to the actuating levers 105 by links 137, a bifurcated portion 138 being formed in the right end (Fig. 2) of each actuating lever 105 in which a roller 139 pinned to the link 137 is positioned. The links are slidable in suitable guides 140 and 141.

The perforating pins 131 are slidably mounted in apertures 142 formed in a stripper plate 143 secured to and movable with the ram 135. A second plate 151 secured to the sides 11 and 12 has apertures 152 therein in which the perforating pins 131 are slidable and serves as a guide plate. This plate 151 also serves as a support for the pins 136 upon which the ram 132 is slidable. A die plate 153 having apertures 154 therein in direct vertical alignment with the pins 131 is mounted just below the guide plate 151 being spaced therefrom at 155 to permit the insertion of a tabulating card 156 between the guide plate 151 and the die plate 153.

It is believed that a better understanding of the apparatus disclosed hereinbefore will be had by reference to the following description of the operation thereof.

Let it be assumed that the calculating or computing machine (not shown) has transmitted to the accumulator a series of digital values with the result that the four lower orders of the accumulator have the amount 9999 stored therein. In the creeping carry type of accumulator the indicating element in the units order will rest exactly in the 9 position, i. e., it will have rotated through nine-tenths of a revolution. The indicating element in the tens order will indicate 9.9, i. e., it will have rotated ninety-nine hundredths of a revolution. The indicating element in the hundredths order will indicate 9.99, i. e., it will have rotated through nine-hundred and ninety-nine one-thousandths, and the indicating element in the thousandths order will indicate 9.999, i. e., it will have rotated through nine-thousand nine-hundred and ninety-nine ten-thousandths of a revolution. The ten-thousandths order wheel will indicate .9999, i. e., it will have rotated through nine-thousand nine-hundred and ninety-nine one-hundred-thousandths of a revolution, and the succeeding higher orders of indicating elements will have rotated through fractional portions of a revolution decreasing proportionately to the decrease between the thousandths order indicating element and the ten-thousandths order indicating element. All of the foregoing described operation is common to creeping carry accumulators and no further explanation thereof is deemed necessary.

The first step in the operation of clearing the accumulator back to zero and making the record of the number which was stored therein prior to its zeroizing or clearing is the operation of the key 100 to close its contact and connect battery at 101 through the winding of the electromagnet 77, thereby energizing the electromagnet causing it to attract its armature which is in the form of latch 78 thereby releasing the pawl 81 and permitting the spring 89 to move the pawl into engagement with the ratchet tooth 82 which is constantly rotating. The entire clearout and recording mechanism will thereupon be driven through one complete cycle wherein the shaft 75 will rotate through one revolution.

In rotating through one complete revolution the shaft 75 will, through the cooperating gears 113 and 114, drive the shaft 115 through one complete revolution. The shafts 75 and 115, in making one complete revolution, will drive their associated cams 74, 102, 107 and 116 through one revolution.

The first operation which takes place will be the camming of the rack actuating levers 62 to the right (Fig. 2). This is accomplished by the cam 107—107 driving the push rods 108—108 to the right (Fig. 2) to move the rack actuating levers and all of the racks 52 to their extreme right hand position (Fig. 2). As soon as the racks have reached their extreme right hand position the latches 120 will drop into the notches 123 and hold all of the racks in their right hand position. While held in the right hand positions by the latches 122 the racks will be simultaneously moved down into engagement with their associated gears 50 due to the movement downwardly of the carriage 55 by the cam 74 which will now become operative to move the arms 70—70 downwardly. Immediately after the racks 52 have moved into mesh with the gears 50 the cams 116 will become effective starting with the lowest or units order to cam the latch release pin 118 of each order upwardly, thereby moving the latch 120 out of its associated notch 123 in each denominational order starting with the lowest order. The units order rack 52 being the first rack to be released, will start to carry the cross arm 61 and levers 62 back to their normal position, and the rack or racks which, because of the higher value of the number stored therein, is the first to return to normal, will move the arm 61 to normal, as shown in Fig. 2. The latch release pin 118 will be held in its upper position (Fig. 2) until near the end of the revolution of the shaft 115 and in moving to its upper position will tend to carry with it the abutment 127. In the units order the abutment will be moved upwardly since the stop 150 will not be in the way. As soon as the units order latch release pin 118 has operated, the rack 52 in the units order will be drawn to the left (Fig. 2) by its spring 57 and will carry its associated selector bar 130 which, together with all of the selector bars, had been moved to the extreme right hand position where their heads 132 were over the heads of the extreme right hand perforating pin 131 (0) back to position over the left hand pin 131 (9). The indicating element 13 will be driven in a clockwise direction by the rack 52 and idler 50 through nine positions to return the head 132 of the selector bar 130 to position over the 9 pin. The indicating element 13 in the units order, in being returned to its zero indicating position will, (the gears 30 of higher orders being held stationary by the center stop 23 and intermeshing gears 21 and 30) return the indicating element of the tens order to a position where it will indicate an integral value and no fraction. In like manner, the hundreds, thousands, ten thousands orders, etc. will have the very lowest decimal fraction deducted therefrom due to the 10 to 1 ratio between each set of planetary gears. Shortly after the latch release pins 118 of the units order is actuated, the latch release pin 118 of the tens order will be actuated to permit the spring 57 in the tens order to retract the rack 52 in the tens order to its normal position where the head 132 of the selector bar 130 in the tens order will be over the head of the 9 pin 131. All of the racks 52 will be retracted in order, starting with the lowest denominational order until their associated indicating elements 13 reach zero position, which, with the assumed condition of the registers prior to clearout or zeroizing, will result in the heads 132 of the selector bars 130 in the units, tens, hundreds, and thousands orders coming back to a position over the heads 133 of the perforating pins 131 (9) and the next eight higher orders of selector bars 130 will have their heads 132 positioned over the heads 133 of the perforating pins 131 representing naughts (0).

The purpose of releasing the latch pins 118 successively, starting with the lowest order, is to avoid the necessity of differentiating between a dial indicating zero and one, as for example, the hundreds order in the assumed problem, standing on 9 plus .99. After one dial moves two units or more in a clockwise direction, the mechanism is capable of distinguishing whether the digit stored in the next higher order element is, say 9.99, or 1.0. Because of this arrangement it is unnecessary to construct the cooperating stops 127 and 150 with sufficient precision to prevent them from engaging when the accumulator element stands on 9 plus such a large fraction that to the eye it is apparently standing on zero. Also it will be apparent that when all of the indicating elements have been returned to zero positions, the selector bars will have come to rest a whole number of units from their extreme right hand positions. After all of the selector bars have reached their proper position, as determined by the indicating elements 13 coming to rest in zero position due to the stop 150 striking abutment 127 in each order, the cam 102 will rock the ram actuating lever 105 in a clockwise direction, to cause the ram to move downwardly, thereby to force those perforating pins which have one of the heads 132 of the selector bars 130 in direct vertical alignment therewith, through a card 156 which had been placed manually in the opening 155. After a card 156 has been perforated to record the number which had been stored in the accumulator, the ram 135 will be moved upwardly by the ram actuating lever 105, due to the configuration of the cam groove 103 and immediately after the ram 135 reaches its normal position, as shown in Fig. 2, the cams 74 will raise the carriage 55 to the position shown in Fig. 2, thereby moving the teeth of the racks 52 out of mesh with their associated idler gears 50 whereby all of the selector bars 130 which are not in their normal or 9 position will be returned to normal position. Immediately after the selector bars 130 and racks 52 are returned to their normal position, the cams 116 will simultaneously release their associated latch release pins 118 and the cycle of operation will be complete, the shafts 75 and 115 coming to a stop and the accumulator being now ready to receive the result of another computation.

What is claimed is:

1. In a calculating machine, a plurality of accumulator indicating elements movable during calculating operations through whole number spaces and interconnected to move through fractions of whole number spaces for "carry overs", a rack individual to each element, a selector bar individual to each rack, a plurality of recording elements associated with each selector bar, means for moving the racks in one direction to prepare them for operative association with the elements, means for moving the racks into operative association with the elements, means for moving the racks to return the elements successively to zero indicating positions and to eliminate the fractional reading on one element as its next lower element returns to zero indicating position, and means interconnecting the racks and selector bars to cause the selector bars to each select a recording element for actuation when the racks return the indicating elements to zero, and means for actuating the selected recording elements.

2. In a calculating machine, a plurality of separately driven accumulator elements, differential carrying mechanism for said accumulator elements, a rack carriage, a plurality of racks supported by said carriage, means for moving said carriage to shift the racks into position to drive the accumulator elements, means for urging the racks to move in a direction to return the elements to zero, a plurality of latches for holding the racks inoperative to return the accumulator elements to zero, means for releasing said latches separately to permit the racks to return the elements to zero separately, and a recorder selector connected to each rack.

3. In a calculating machine, a plurality of separately operable accumulator elements, a plurality of planetary gear arrangements interconnecting adjoining accumulator elements for effecting carries, a recording mechanism, and means for returning said accumulator elements to zero position and for controlling the operation of the recording mechanism including a reciprocable frame, a plurality of racks supported by said frame and normally urged in a predetermined direction, means for moving said racks in the opposite direction, means for shifting said carriage to move the racks carried thereby into driving relation with the accumulator elements, and means for holding said racks and for releasing said racks one at a time to permit them to drive the accumulator elements to their zero position, thereby to control the recording mechanism.

4. In a calculating machine, a plurality of separately driven accumulator elements, differential carrying mechanism for said accumulator elements, a carriage, a plurality of racks supported by said carriage, means for moving said carriage to shift the racks into position to drive the accumulator elements, resilient means tending to move said racks in a direction to return the elements to zero, a plurality of latches for holding the racks inoperative to return the accumulator elements to zero, means for releasing said latches separately to permit the racks to return the elements to zero separately, a zero stop on each accumulator element, a recorder selector connected to each rack, and a resilient member carried by said releasing means for stopping each accumulator element when it reaches its zero position.

5. In a calculating machine, a plurality of separately driven accumulator elements, differential carrying mechanism for said accumulator elements, a carriage, a plurality of racks supported by said carriage, means for moving said carriage to shift the racks into position to drive the accumulator into position to drive the accumulator elements, means for urging said racks in a direction to clear the accumulator elements, a plurality of latches for holding the racks inoperative to return the accumulator elements to zero, and means for releasing said latches separately to permit the racks to return the elements to zero separately, a zero stop on each accumulator element, a recorder selector connected to each rack, and a resilient member carried by said releasing means for stopping each accumulator element when it reaches its zero position, said means for moving said carriage being also operable to move the carriage in the opposite direction to permit the racks to move to their normal position.

6. In a calculating machine, a recording mechanism, a planetary gear accumulator having a plurality of indicating elements, actuating members individual to each indicating element for selectively controlling the recording mechanism, means for conditioning the actuating members for association with the indicating elements, means for retaining them when conditioned, means for moving the conditioned members into operative association with the indicating elements, and means for releasing the members in a predetermined sequence to return the elements to zero and to transfer the result therefrom to the recording mechanism.

HAROLD G. JOHNSTONE.